US009863670B2

(12) United States Patent
Champagne

(10) Patent No.: US 9,863,670 B2
(45) Date of Patent: Jan. 9, 2018

(54) EXTENDED TRAVEL FLEXURE BEARING AND MICRO CHECK VALVE

(71) Applicant: LOCKHEED MARTIN CORPORATION, Bethesda, MD (US)

(72) Inventor: Patrick Champagne, Portola Valley, CA (US)

(73) Assignee: LOCKHEED MARTIN CORPORATION, Bethesda, MD (US)

(*) Notice: Subject to any disclaimer, the term of this patent is extended or adjusted under 35 U.S.C. 154(b) by 647 days.

(21) Appl. No.: 14/346,140

(22) PCT Filed: Sep. 20, 2012

(86) PCT No.: PCT/US2012/056357
§ 371 (c)(1),
(2) Date: Mar. 20, 2014

(87) PCT Pub. No.: WO2013/043883
PCT Pub. Date: Mar. 28, 2013

(65) Prior Publication Data
US 2014/0216064 A1 Aug. 7, 2014

Related U.S. Application Data

(60) Provisional application No. 61/536,993, filed on Sep. 20, 2011.

(51) Int. Cl.
F25B 1/00 (2006.01)
F25B 9/02 (2006.01)
(Continued)

(52) U.S. Cl.
CPC .............. F25B 9/02 (2013.01); F04B 35/045 (2013.01); F04B 39/0005 (2013.01);
(Continued)

(58) Field of Classification Search
CPC .......... F25B 9/14; F25B 9/02; F25B 2309/001
See application file for complete search history.

(56) References Cited

U.S. PATENT DOCUMENTS 1,925,934 A 9/1933 Rimstad et al.
2,383,486 A 8/1945 Isenberg et al.
(Continued)

FOREIGN PATENT DOCUMENTS

JP 07-243743 9/1995
JP 11-182424 7/1999
(Continued)

OTHER PUBLICATIONS

KR10-1999-0057578A Translation.*
(Continued)

Primary Examiner — Frantz Jules
Assistant Examiner — Brian King
(74) Attorney, Agent, or Firm — Terry M. Sanks, Esq.; Beusse Wolter Sanks & Maire, PLLC

(57) ABSTRACT

Variations of the devices and methods disclosed herein pertain to an extended travel spiral flexure bearing having spiral arms, each of the spiral arms including an attachment point at the inner end thereof and at the outer end thereof. Variations of the bearing may also include a bearing clamp to be attached to the spiral flexure bearing at the attachment points, the bearing including an outer bearing portion to be disposed on the outer periphery of the flexure bearing and an inner bearing portion to be disposed at the center of the flexure bearing. Variations also pertain to a micro check valve assembly that includes a valve base, a valve cover, and a flexure that are all bonded together. The valve being closed when the valve door rests on the valve seat and open when the valve door is lifted from the valve seat.

8 Claims, 14 Drawing Sheets

(51) Int. Cl.
- *F04B 49/22* (2006.01)
- *F04B 53/00* (2006.01)
- *F16F 1/18* (2006.01)
- *F25B 1/02* (2006.01)
- *F04B 35/04* (2006.01)
- *F04B 39/00* (2006.01)
- *F04B 39/10* (2006.01)

(52) U.S. Cl.
CPC ............ *F04B 39/10* (2013.01); *F04B 49/225* (2013.01); *F04B 53/00* (2013.01); *F16F 1/185* (2013.01); *F25B 1/02* (2013.01); *F25B 2400/073* (2013.01); *F25B 2400/074* (2013.01); *Y10T 137/85978* (2015.04)

(56) References Cited

U.S. PATENT DOCUMENTS

| | | | |
|---|---|---|---|
| 3,884,814 A | 5/1975 | Vogt et al. | |
| 4,386,505 A | 6/1983 | Little | |
| 4,392,362 A | 7/1983 | Little | |
| 4,489,570 A | 12/1984 | Little | |
| 4,781,033 A | 11/1988 | Steyert et al. | |
| 4,785,879 A | 11/1988 | Longsworth et al. | |
| 4,908,112 A | 3/1990 | Pace | |
| 4,911,846 A | 3/1990 | Akasu et al. | |
| 5,239,200 A | 8/1993 | Messina et al. | |
| 5,249,425 A | 10/1993 | Longsworth | |
| 5,382,797 A | 1/1995 | Kunimoto et al. | |
| 5,611,214 A | 3/1997 | Wegeng et al. | |
| 5,758,822 A | 6/1998 | Yap | |
| 5,920,133 A * | 7/1999 | Penswick | F02G 1/043 310/15 |
| 5,974,808 A | 11/1999 | Mangano et al. | |
| 6,041,821 A | 3/2000 | Grossman | |
| 6,189,433 B1 | 2/2001 | Harada | |
| 6,621,071 B2 | 9/2003 | Sobel et al. | |
| 7,883,901 B2 | 2/2011 | Kitazawa et al. | |
| 8,141,556 B2 | 3/2012 | Ruben | |
| 2003/0102435 A1* | 6/2003 | Myers | G01J 5/061 250/352 |
| 2004/0123605 A1 | 7/2004 | Pruitt et al. | |
| 2005/0112001 A1 | 5/2005 | Bahnen et al. | |
| 2005/0230085 A1 | 10/2005 | Valenzuela | |
| 2005/0244660 A1 | 11/2005 | Yuasa et al. | |
| 2006/0057407 A1 | 3/2006 | Sambasivan et al. | |
| 2006/0231237 A1 | 10/2006 | Dangelo | |
| 2007/0209371 A1 | 9/2007 | Sobel | |
| 2007/0245749 A1 | 10/2007 | Atkins et al. | |
| 2009/0126373 A1 | 5/2009 | Burg | |
| 2009/0258470 A1 | 10/2009 | Choi et al. | |
| 2009/0272270 A1 | 11/2009 | McGill et al. | |
| 2010/0283854 A1 | 11/2010 | McKaughan et al. | |
| 2011/0174467 A1 | 7/2011 | Herbst | |
| 2012/0079838 A1 | 4/2012 | Bin-Nun et al. | |
| 2012/0229959 A1 | 9/2012 | Holcomb | |
| 2013/0161705 A1 | 6/2013 | Disney et al. | |
| 2013/0180862 A1 | 7/2013 | Yoshida et al. | |

FOREIGN PATENT DOCUMENTS

| | | | |
|---|---|---|---|
| JP | 11-324914 | | 11/1999 |
| JP | 11324914 A | * | 11/1999 |
| JP | 4422977 | | 3/2010 |
| KR | 10-1999-0057578 | | 7/1999 |
| KR | 10-1999-0057578 A | * | 7/1999 |
| KR | 10-2005-0031777 | | 4/2005 |
| WO | 0053992 | | 9/2000 |
| WO | 200053992 | | 9/2000 |
| WO | 2013016224 | | 1/2013 |

OTHER PUBLICATIONS

Esser-Kahn, et al., Three-Dimensional Microvascular Fiber-Reinforced Composites, Advanced Materials, wileyonlinelibrary.com, Wiley-VCH Verlag GmbH & Co. KGaA, Weinheim, 2011, XX, pp. 1-5.

Pope, Alan W. et al., Development of a Two-Stage Alternate Joule-Thomson Cryo-Cooler for AAWS-M Risk Reduction, No. AMSMI-TR-RD-AS-91-22, Army Missile Command Redstone Arsenal AI Advanced Sensors Directorate, 1991.

Little, W.A, et al., "Microminiature Refrigeration," AIP Conference Proceedings, vol. 985, No. 1, 2008.

Narayan, S. Pradeep et al., "Analysis of Performance of Heat Exchangers Used in Practical Micro Miniature Refrigerators," Cryogenics 39.6 (1999): 517-527.

Lerou, P.P.O.M. et al., "All-Micromachined Joule-Thomson Cold Stage," 2007, 437-441.

Little, W.A. et al., "Development of a Low Cost, Cryogenic Refrigeration System for Cooling of Cryoelectronics," Advances in Cryogenic Engineering, Springer US, 1994, 1467-1474.

Chorowski, M.E. Bodio, et al., "Development and Testing of a Miniature Joule-Thomson Refrigerator with Sintered Powder Heat Exchanger," Advances in Cryogenic Engineering, Springer, US, 1994, 1475-1481.

Lyon, K.G. et al., "Linear Thermal Expansion Measurements on Silicon from 6 to 340 K," Journal of Applied Physics, 48.3 (1977): 865-868.

McConnell, Angela D. et al., "Thermal Conductivity of Doped Polysilicon Layers," Microelectromechanical Systems, Journal of 10.3 (2001: 360-369.

Esser-Kahn et al., "Three-Dimensional Microvascular Fiber-Reinforced Composites," Advanced Materials, wileyonlinelibrary.com, Wiley-VCH Verlag GmbH & Co. KGaA, Weinheim 2011, XX, pp. 1-5.

* cited by examiner

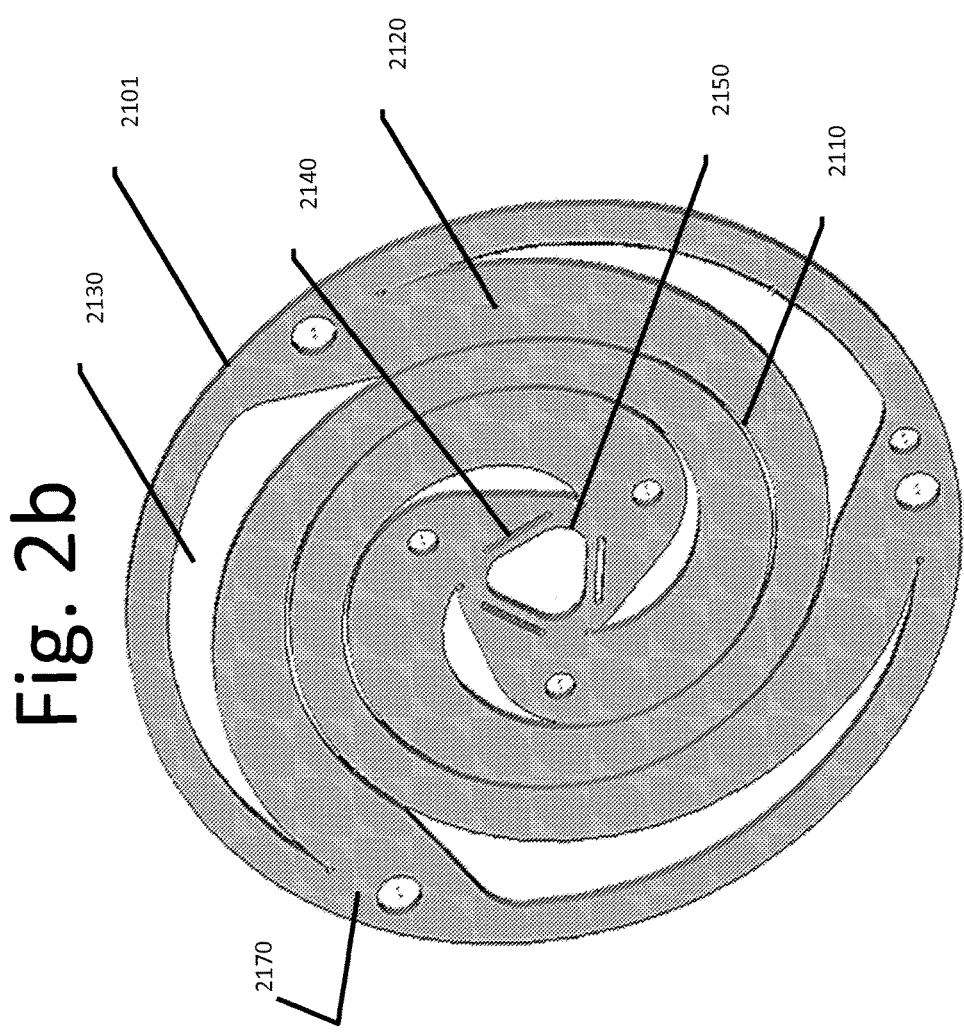

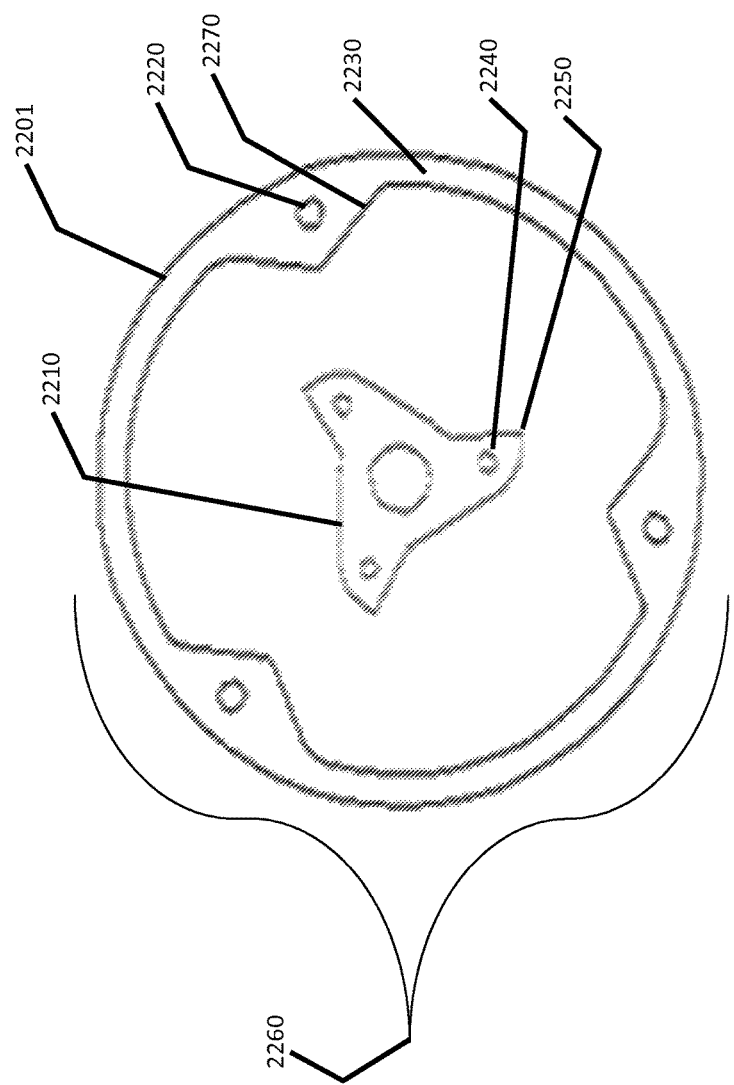

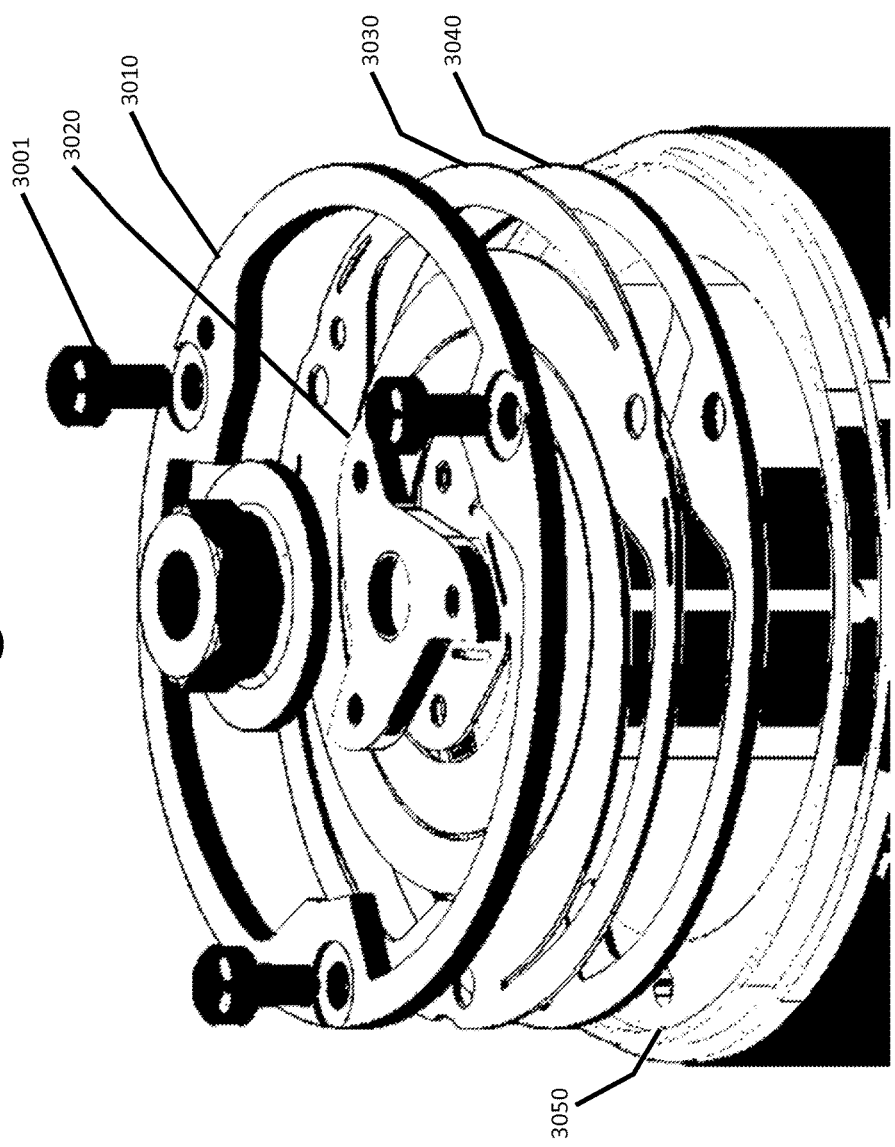

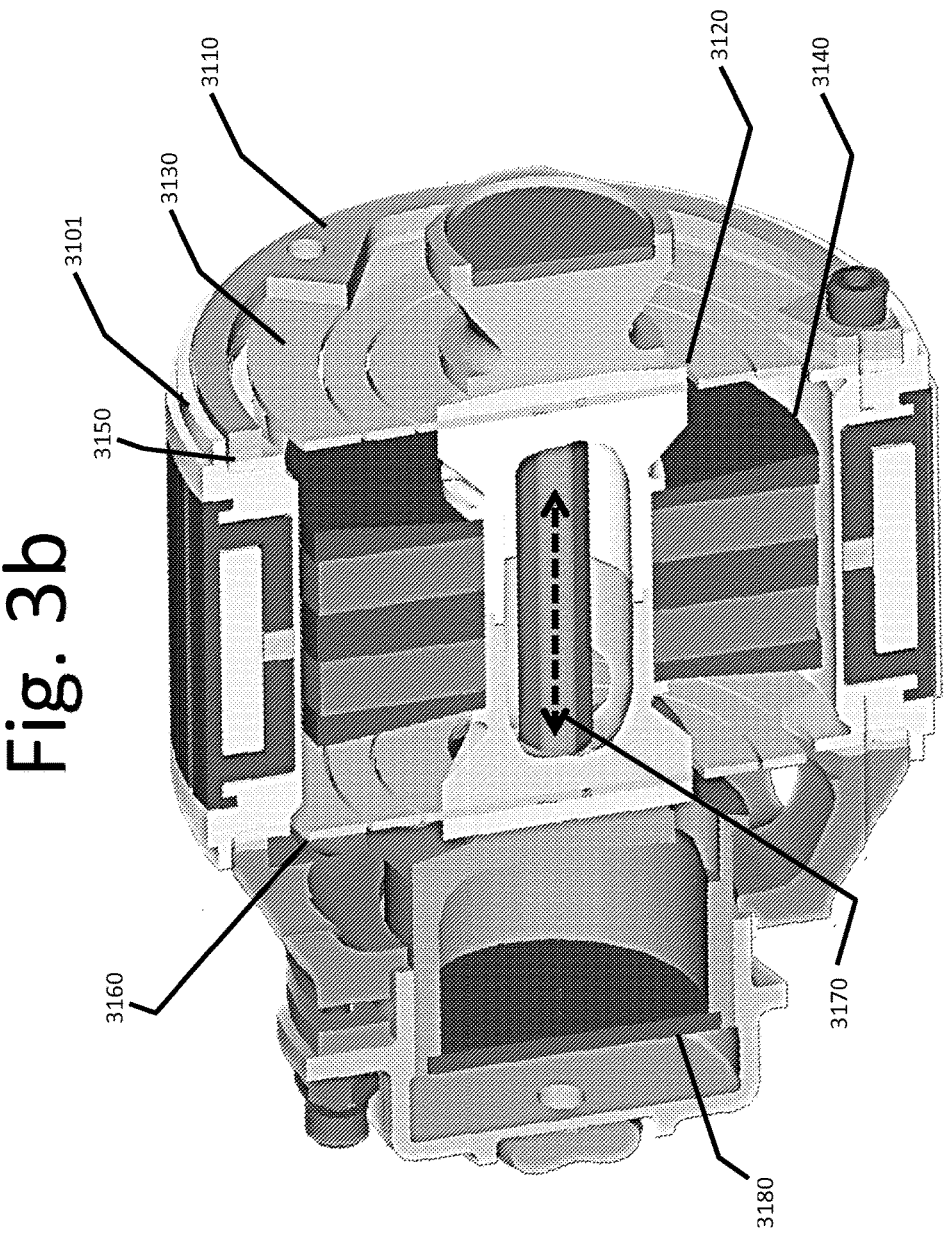

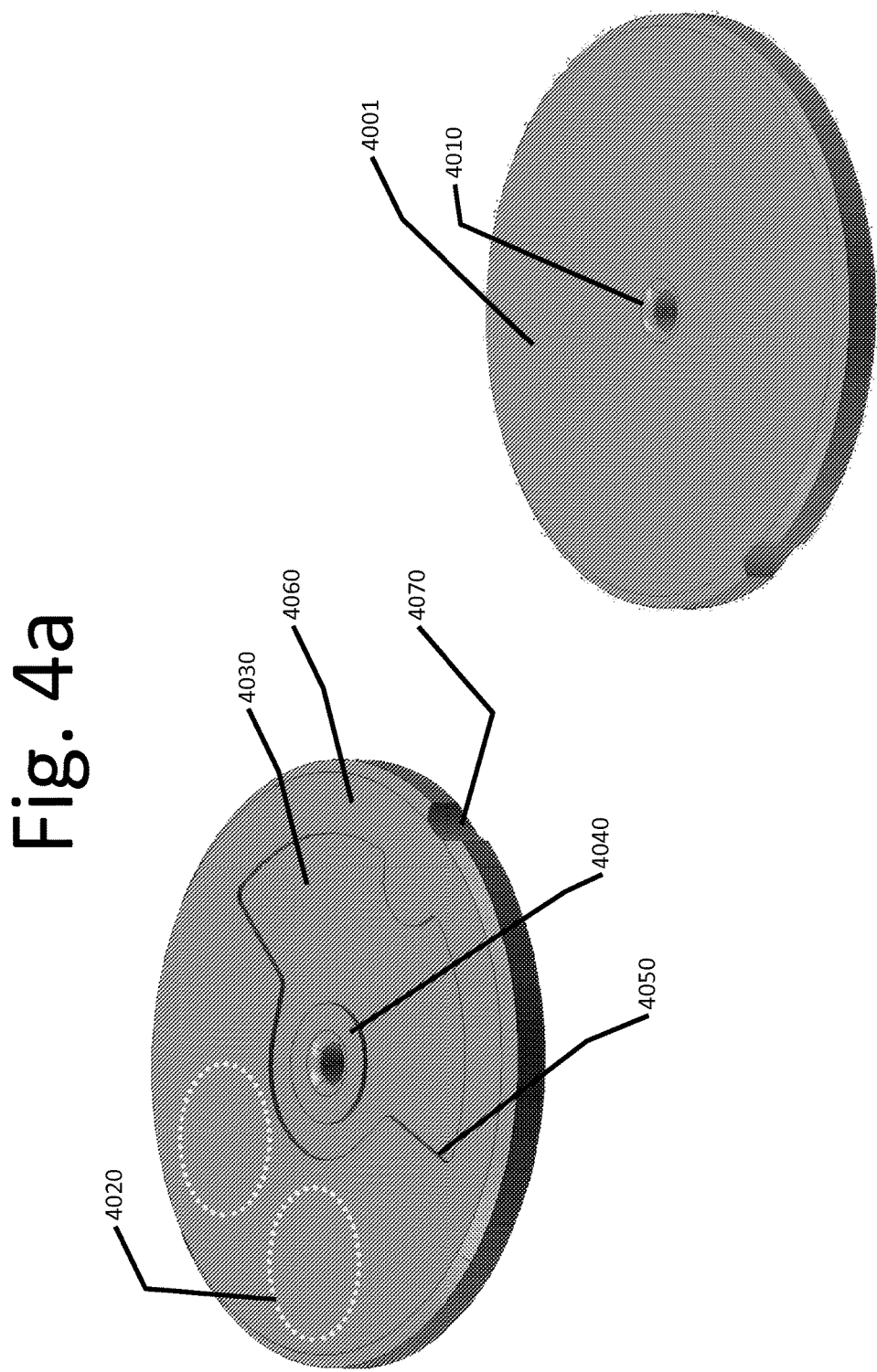

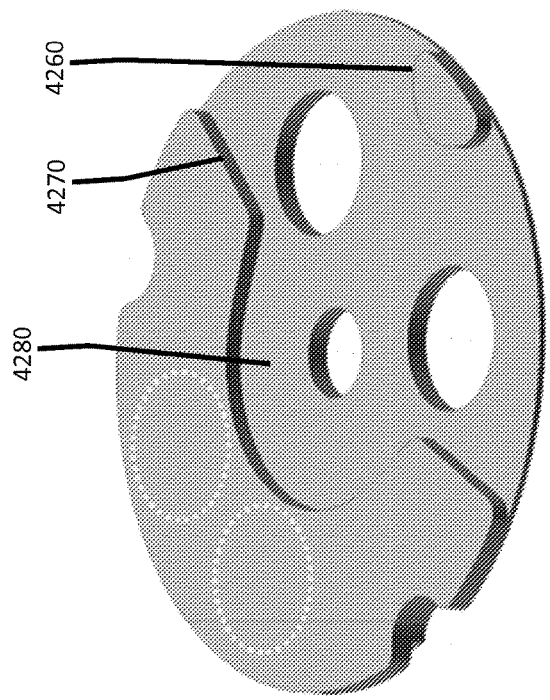
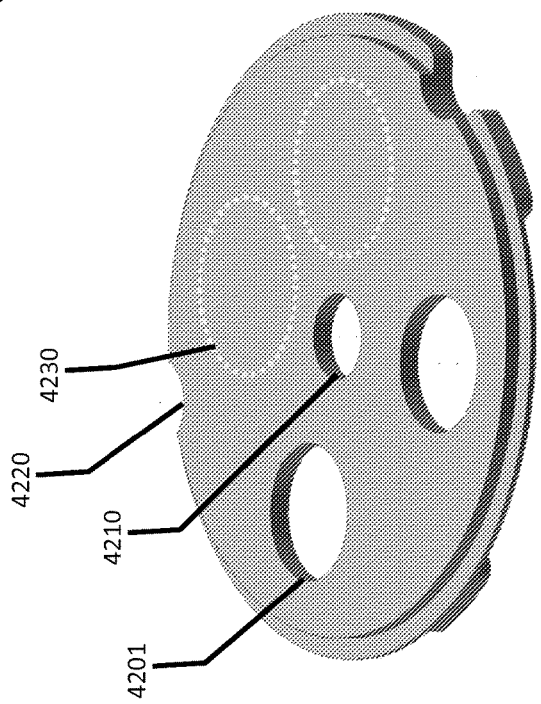
Fig. 4c

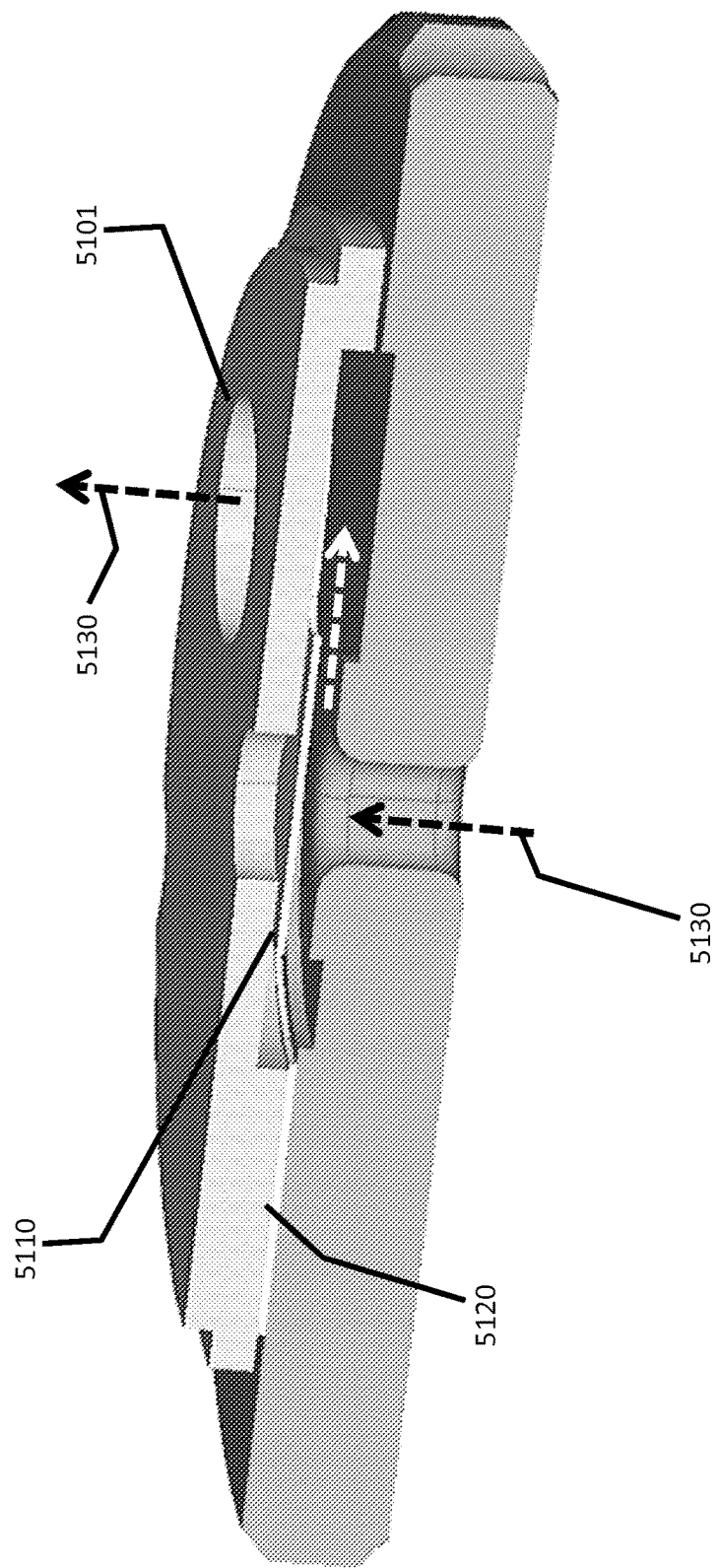

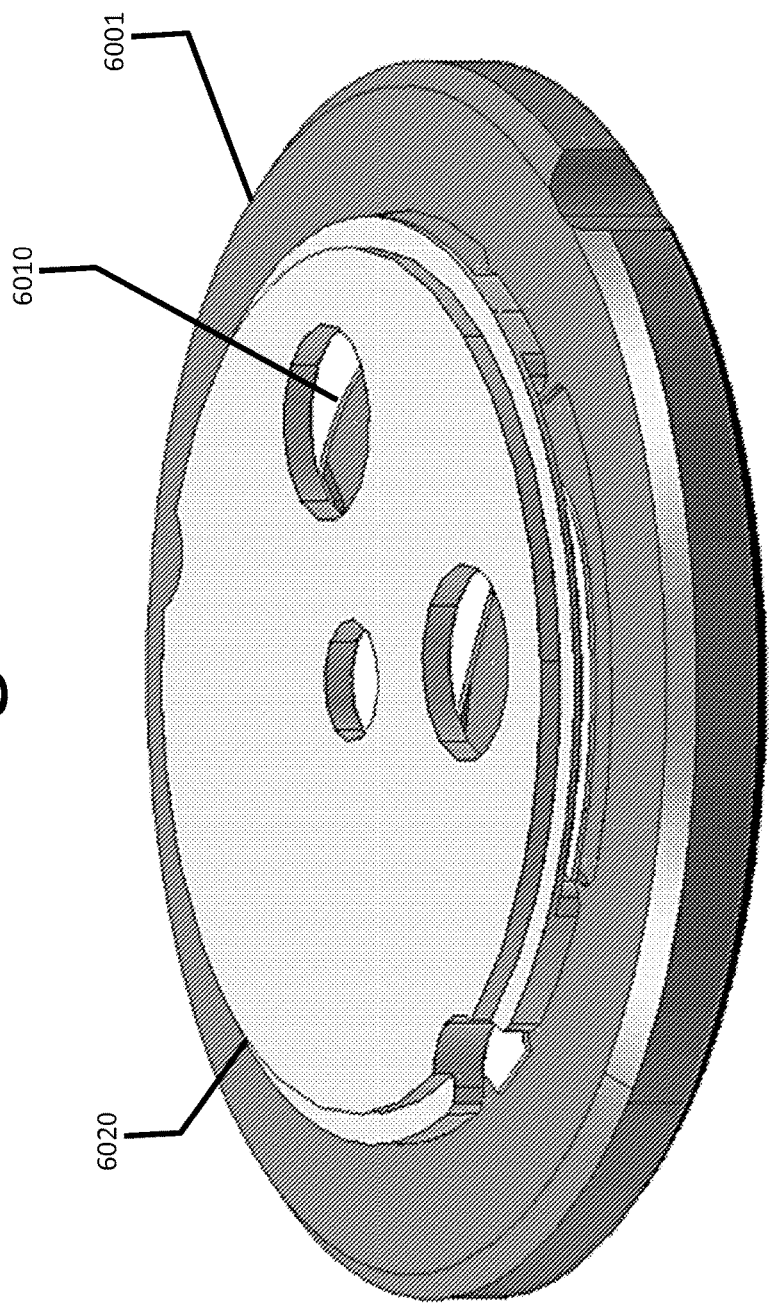

EXTENDED TRAVEL FLEXURE BEARING AND MICRO CHECK VALVE

The present Application claims benefit of priority to U.S. provisional application 61/536,993, which was filed in the United States Patent and Trademark Office on Sep. 20, 2011, the entire contents of which are hereby incorporated by reference.

BACKGROUND

For some IR sensor applications, may be necessary to meet two critical performance requirements with the same system design configuration: very fast cooldown time (seconds to reach Sensor operating temperature) and long system operational run times (enabling the system to operate for thousands of hours without maintenance or service). Also, in some cases, the ability to abort a mission and re-use the device at a later date can be a desirable feature and adds operational flexibility.

The requirements for achieving very quick cooldown time to operating temperature and maintaining long operational run times are challenging to realize for applications where weight, size and power are a premium. Applications such as a seeker on a missile or a surveillance sensor, are preferably small, lightweight, portable and adaptable. So there is generally a trade-off between quick cooldown time and operational run time because of size and weight constrains.

Cryocoolers designed for applications requiring very fast turn on times are generally based on the Joule Thomson (J-T) effect because of the very high rates of cooling achievable with this cooling cycle. As a result, applications requiring rapid IR sensor activation typically use J-T cooling approaches because fast cooldown times are crucial to the program. However, some variations of J-T type coolers suffer from relatively short run times because of the size, weight and power penalty associated with running these coolers for long periods of time. J-T cryostats can be made very small, lightweight and compact but lack operational run time. Although longer operational times can be realized by supplying a J-T cooler with large reservoir volumes of very high pressure gasses or very large compressors to supply very high pressure gasses, such solutions add to the size, weight and power to the device.

SUMMARY

In view of the foregoing problems, it would be desirable to have a cooler which can meet the requirements of fast cool-down and long operation time while remaining small, light-weight, and relatively low-power. The purpose of this document is to address this problem and provide a design approach which will meet these requirements and be small in size, low weight and low input power. This Design provides a JT cooler that achieves both performance requirements and meets size and weight constraints in the same system. Some variations of the design discussed herein allow for both open and closed cycle modes of operation in the same IDCA, and thereby achieves both very fast cooldown and extended steady state continuous operation without the need for bulky gas reservoirs or bulky compressors. This Design also provides a method of operating a JT cooler to achieve the above-stated objectives.

Variations of the devices discussed herein may pertain to an integrated detector cooler assembly (IDCA) comprising a cryostat having at least one cooling circuit disposed therein; a compressor; and a refrigerant source having a refrigerant to be provided to the cooling circuit; where the compressor provides the refrigerant to the cooling circuit, the cooling circuit being configured for closed-loop operation; and the compressor includes a compressor pump, the compressor pump including a piston operably connected to an extended travel spiral flexure bearing, the extended travel spiral flexure bearing having two or more spiral arms arranged in a spiral pattern originating at a center of the bearing and extending outward towards an edge of the bearing, being configured for unlimited fatigue life and further, being configured to enable lateral movement of the piston in a plane perpendicular to a plane of the extended travel spiral flexure bearing.

In some variations, the compressor further includes a micro check valve, the micro check valve comprising: a valve base equipped with an inlet port, a valve seat, a flexure clamp area and, a flexure travel clearance area; a valve cover equipped with an exhaust port, a flexure clamp area, and a flexure travel recess area; and a flexure equipped with a valve door, a reverse-bend flexure arm connected to the valve door, and a flexure body; where the valve base, flexure body, and valve cover are bonded together into a micro check valve assembly configured to have open and closed valve positions, where the closed valve position is realized when the valve door rests on the valve seat and where an open position is realized when the valve door is lifted from the valve seat in a flexure space defined by a combination of the flexure travel recess area and the flexure travel clearance area.

In some variations, the spiral flexure bearing includes three spiral arms arranged in a spiral pattern based on a spiral angle of 480 degrees. In some variations, the spiral flexure bearing has an operating stroke of at least 2.3 mm In some variations, the compressor pump includes a second extended travel spiral flexure bearing. In some variations, the extended travel spiral flexure bearing and the second extended travel spiral flexure bearing are disposed on opposite sides of a moving magnet assembly disposed within the compressor pump.

Some variations include a bearing clamp attached to the spiral flexure bearing, the bearing clamp including: an outer clamp; and an inner clamp, the outer clamp being physically separate from the inner clamp; the outer clamp being disposed at the edge of the bearing and being attached to an outer end of each spiral arm of the flexure bearing; the inner clamp being disposed at the center of the bearing and being attached to an inner end of each spiral arm of the flexure bearing.

In some variations, the compressor pump further includes a housing base arranged around the moving magnet assembly such that the extended travel spiral flexure is attached to one end of the housing base and the second extended travel spiral flexure is attached to an opposite end of the housing base.

Variations of the devices discussed herein may pertain to an extended travel spiral flexure bearing having a circular shape, the bearing comprising: two or more spiral arms, each spiral arm having an outer end disposed near an outer periphery of the flexure bearing and an inner end disposed near a center of the flexure bearing, where each of the spiral arms includes an attachment point at the inner end thereof and at the outer end thereof.

Some variations may include a bearing clamp to be attached to the spiral flexure bearing at the attachment points, the bearing including: an outer bearing portion to be disposed on the outer periphery of the flexure bearing, the outer bearing portion having an outer periphery and an inner periphery, the outer periphery of the outer bearing portion having a circular shape, the inner periphery of the outer bearing portion having outer protruding portions corresponding to the attachment points at the outer ends of the spiral arms, the outer protruding portions extending from the inner periphery of the outer bearing portion towards the center of the flexure bearing; and the outer protruding portions being configured to be attached to the attachment points at the outer ends of the spiral arms, and an inner bearing portion to be disposed at the center of the flexure bearing, the inner bearing portion inner protruding portions extending outward from a center of the inner bearing portion, the inner protruding portions corresponding to the attachment points at the inner ends of the spiral arms and being configured to be attached to the attachment points at the inner ends of the spiral arms.

In some variations, the flexure bearing has a lateral stiffness of at least 27 N/mm In some variations, the flexure bearing is made from stainless steel. In some variations, the spiral arms are arranged in a spiral pattern based on a spiral angle of at least 480 degrees. In some variations, the flexure bearing includes three spiral arms arranged in a spiral pattern. In some variations, the bearing has an outer flexure diameter of 70 mm In some variations, the bearing has an extension capability of 8.5 mm Some variations further include a spacer to be attached to the spiral flexure bearing such that the spacer and the outer bearing portion are on opposite sides of the flexure bearing, the spacer having a shape substantially similar to that of the outer bearing portion and having spacer protruding portions corresponding to the attachment points at the outer ends of the spiral arms, the spacer protruding portions configured to be attached to the attachment points at the outer ends of the spiral arms.

Variations of the devices discussed herein may pertain to a micro check valve assembly, the assembly comprising: a valve base equipped with an inlet port, a valve seat, a flexure clamp area and, a flexure travel clearance area; a valve cover equipped with an exhaust port, a flexure clamp area, and a flexure travel recess area; and a flexure equipped with a valve door, a reverse-bend flexure arm connected to the valve door, and a flexure body; where the valve base, flexure body, and valve cover are bonded together into a micro check valve assembly configured to have open and closed valve positions, where the closed valve position is realized when the valve door rests on the valve seat and where an open position is realized when the valve door is lifted from the valve seat in a flexure space defined by a combination of the flexure travel recess area and the flexure travel clearance area.

In some variations, the valve base, valve cover, and flexure are bonded together by spot welding the valve base, valve cover, and flexure together, the spot welding creating a spot weld area on each of the valve cover, valve base, and flexure.

In some variations, the spot weld area includes two spot weld points. In some variations, at least one of the valve base, valve cover, and flexure are made of stainless steel.

In some variations, the flexure is stamped from a metal ribbon such that the flexure is equipped with breakaway tabs on the flexure body. In some variations, the valve cover is equipped with recessed portions disposed over the breakaway tabs such that the breakaway tabs protrude out from under the valve cover.

In some variations, the valve base has a diameter of 5 mm In some variations, the valve is configured to rectify a flow of refrigerant being pumped into an integrated detector cooler assembly (IDCA) by a compressor pump.

Variations of the devices discussed herein may pertain to a compressor that pumps refrigerant for a cooling circuit, the compressor comprising: a compressor pump, the compressor pump including a piston operably connected to an extended travel spiral flexure bearing, the extended travel spiral flexure bearing having two or more spiral arms arranged in a spiral pattern originating at a center of the bearing and extending outward towards an edge of the bearing, being configured for unlimited fatigue life and further, being configured to enable lateral movement of the piston in a plane perpendicular to a plane of the extended travel spiral flexure bearing.

In some variations, the compressor includes a micro check valve, the micro check valve comprising: a valve base equipped with an inlet port, a valve seat, a flexure clamp area and, a flexure travel clearance area; a valve cover equipped with an exhaust port, a flexure clamp area, and a flexure travel recess area; and a flexure equipped with a valve door, a reverse-bend flexure arm connected to the valve door, and a flexure body; where the valve base, flexure body, and valve cover are bonded together into a micro check valve assembly configured to have open and closed valve positions, where the closed valve position is realized when the valve door rests on the valve seat and where an open position is realized when the valve door is lifted from the valve seat in a flexure space defined by a combination of the flexure travel recess area and the flexure travel clearance area.

In some variations, the spiral flexure bearing includes three spiral arms arranged in a spiral pattern based on a spiral angle of 480 degrees. In some variations, the spiral flexure bearing has an operating stroke of at least 2.3 mm.

Some variations, may include at least a second extended travel spiral flexure bearing. In some variations, the extended travel spiral flexure bearing and the second extended travel spiral flexure bearing are disposed on opposite sides of a moving magnet assembly disposed within the compressor pump.

Some variations may include a bearing clamp attached to the spiral flexure bearing, the bearing clamp including: an outer clamp; and an inner clamp, the outer clamp being physically separate from the inner clamp; the outer clamp being disposed at the edge of the bearing and being attached to an outer end of each spiral arm of the flexure bearing; the inner clamp being disposed at the center of the bearing and being attached to an inner end of each spiral arm of the flexure bearing.

Some variations may include a housing base arranged around the moving magnet assembly such that the extended travel spiral flexure is attached to one end of the housing base and the second extended travel spiral flexure is attached to an opposite end of the housing base.

Some variations may include a first bearing clamp, of the type and structure described above, attached to the extended travel spiral flexure bearing in the manner described above, and a second bearing clamp attached to the second extended travel spiral flexure, the second bearing clamp being substantially identical to the first bearing clamp and being arranged, with respect to the second extended travel flexure bearing, in a substantially identical manner as the first bearing clamp.

Further scope of applicability of the techniques and solutions discussed herein will become apparent from the detailed description given hereinafter. However, it should be understood that the detailed description and specific examples, while indicating preferred embodiments of the techniques and solutions discussed herein, are given by way of illustration only, since various changes and modifications within the spirit and scope of the techniques and solutions discussed herein will become apparent to those skilled in the art from this detailed description.

BRIEF DESCRIPTION OF DRAWINGS

The techniques and solutions discussed herein will become more fully understood from the detailed description given herein below and the accompanying drawings which are given by way of illustration only, and thus are not limitative of the techniques and solutions discussed herein, and wherein

FIG. 2b depicts an embodiment of an extended travel flexure bearing as described herein;

FIG. 2c depicts an embodiment of a clamp for an embodiment of an extended travel flexure bearing as disclosed herein;

FIG. 3a depicts an embodiment of a bearing assembly including an embodiment of an extended travel flexure bearing as disclosed herein;

FIG. 3b depicts an embodiment of a compressor pump including an embodiment of extended travel flexure bearings as disclosed herein;

FIG. 4a depicts an embodiment of a base portion of an embodiment of a check valve as disclosed herein;

FIG. 4c depicts an embodiment of a cover portion of an embodiment of a check valve as disclosed herein;

FIG. 5a depicts a cutaway of an embodiment of a check valve as disclosed herein;

FIG. 6 depicts an embodiment of a valve assembly of an embodiment of a check valve as disclosed herein.

Figure 1:
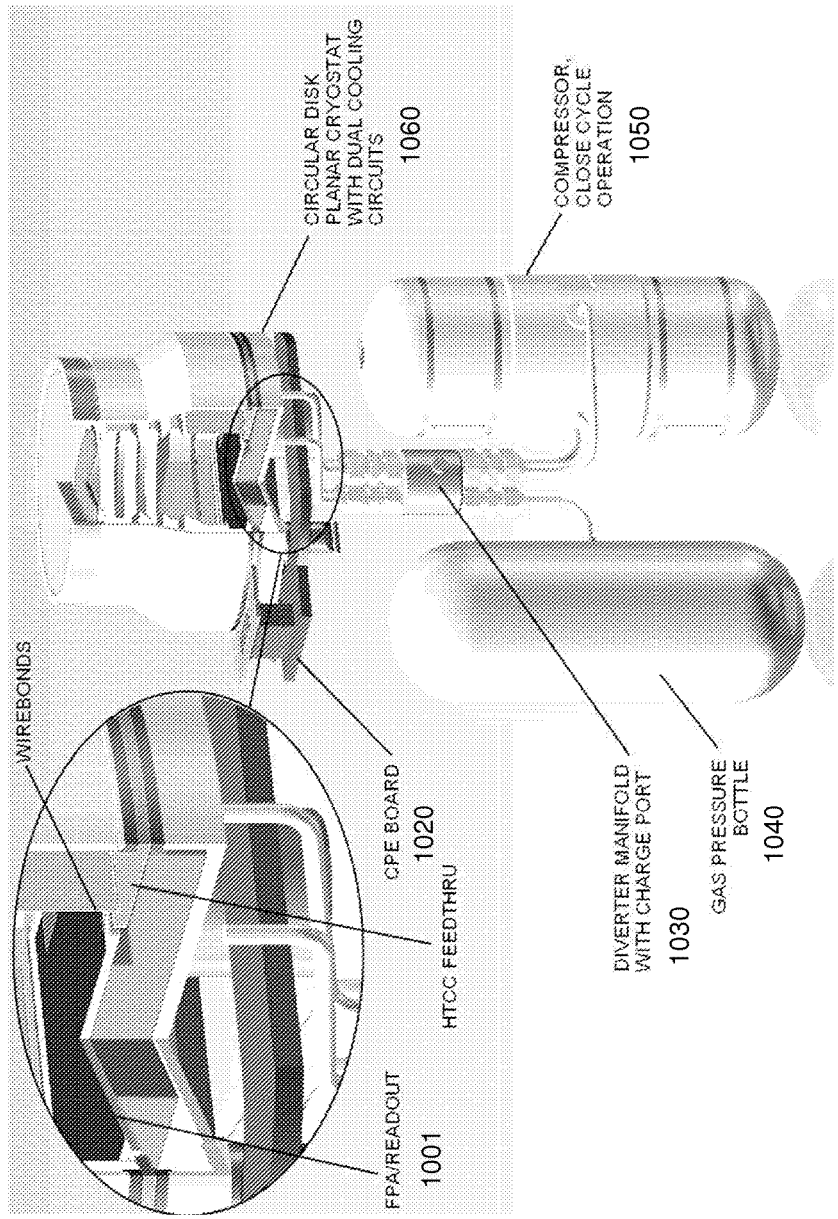
FIG. 1 depicts a variation of an IDCA as disclosed herein.

The drawings will be described in detail in the course of the detailed description of the techniques and solutions discussed herein.

DETAILED DESCRIPTION

The following detailed description refers to the accompanying drawings. The same reference numbers in different drawings identify the same or similar elements. Also, the following detailed description does not limit the techniques and solutions discussed herein. Instead, the scope of the techniques and solutions discussed herein is defined by the appended claims and equivalents thereof.

The above-noted problems can be solved by bringing together three different technologies. The first is the performance of Hot MWIR sensors, i.e. operating detectors at temperatures well above 77K. The second is leveraging the high cooling efficiencies of mixed gas refrigerants at these high sensor operating temperatures. The third is incorporating the design and operation of planar geometry Joule Thomson cryostats to provide multiple J-T cooling circuits in the same planar cryostat, a technique not possible in traditional wound tube heat exchanger J-T cryostat designs.

In view of the foregoing problems, it would be desirable to have a cooler which can meet the requirements of fast cool-down and long operation time while remaining small, light-weight, and relatively low-power. The purpose of this document is to address this problem and provide a design approach which will meet these requirements and be small in size, low weight and low input power. This Design provides a J-T cooler that achieves both performance requirements and meets size and weight constraints in the same system; i.e. providing both open and closed cycle modes of operation in the same IDCA (integrated detector cooler assembly), and thereby achieves both very fast cooldown and extended steady state continuous operation without the need for bulky gas reservoirs or bulky compressors. This Design also provides a method of operating a J-T cooler to achieve the above-stated objectives.

The above problem can be solved by bringing together three different technologies. The first is the performance of HOT (high operating temperature) photodetectors such as Infra-Red (IR) sensors, i.e. operating detectors at temperatures above 77K. The second is leveraging the high cooling efficiencies of mixed gas refrigerants at these high sensor operating temperatures. The third is incorporating the design and operation of planar geometry J-T cryostats to provide multiple J-T cooling circuits in the same planar cryostat, a technique not possible in traditional wound tube heat exchanger J-T cryostat designs.

An optimal preferred sensor temperature(s) may be selected for the HOT photodetector(s) in question. In some variations, a preferred temperature range for a HOT photodetector may be between 100K and 150K. In other variations, a preferred temperature range may be up to 250K or higher. In some variations, a HOT photodetector may be an IR detector configured to detect one or more frequency bands/ranges associated with long-wave, mid-wave, and short-wave IR.

Mixed gas refrigerants can then be tailored and, in some cases, optimized to meet the cooling rates and heat loads of the high temperature detector(s). The high enthalpy changes achievable with mixed gas refrigerants compared to traditional refrigerants, in conjunction with high operating temperatures make very fast cooldown times achievable. In addition, with mixed gasses, the peak pressures and flow rates required for efficient refrigeration can be substantially reduced compared to traditional refrigerants, in some cases by an order of magnitude or more. This makes possible the use of relatively small compressors to provide closed-cycle operation and allows operating in closed-cycle mode with a small compressor. Planar technology cryostat designs are flexible and make possible the integration of multiple cooling circuits in the same refrigeration stage of the Dewar and integrated in an IDCA.

In some variations, a fast cooldown loop may be activated to achieve fast cooldown time to make an MWIR sensor operable quickly, and then a valve or switching device or assembly (such as the diverter manifold shown above) may be used to change the cryostat over into a closed-loop mode that maintains the operating temperature of the device for an extended period and/or conserves refrigerant to allow for multiple activation cycles.

Variations of this concept leverage the advantages of HOT (high operating temperature) photodetectors such as nBn type MWIR detectors. Variations of HOT photodetectors may include devices having reduced dark noise or dark current. Some variations of such devices may include photodetectors of the type taught in U.S. Pat. No. 7,687,871, issued to Shimon Maimon on Mar. 30, 2010, the entire contents of which are hereby incorporated by reference, and/or photo-detectors of the type taught in U.S. Patent Publication 2001/0037097 by Jeff Scott, Published on Feb. 17, 2011, the entire contents of which are hereby incorporated by reference, and/or of the type taught in U.S. Pat. No. 8,044,435, issued on Oct. 25, 2011 to Jeff Scott, the entire contents of which are hereby incorporated by reference, and also further variations thereon.

Mixed gas refrigerants are tailored and optimized to meet the cooling rates and heat loads of high temperature detectors. The very high enthalpy changes achievable with mixed gas refrigerants compared to traditional refrigerants, in conjunction with high operating temperatures make very fast cooldown times achievable. In addition, with mixed gasses, the peak pressures and flow rates required for efficient refrigeration can be substantially reduced compared to traditional refrigerants; i.e. an order of magnitude decrease. This makes possible the use of relatively small compressors to provide closed cycle operation and allows operating in close cycle mode with a small compressor.

Planar technology cryostats design are flexible and make possible the integration of multiple cooling circuits in the same refrigeration stage of the Dewar and integrated in an IDCA. This design provides a method of operating a JT cooler to achieve both performance requirements and meet size and weight constraints in the same system; i.e. provide both open and closed cycle modes of operation in the same IDCA and thereby achieves both very fast cooldown and extended steady state continuous operation without the need for bulky gas reservoirs or bulky compressors. A variation of such an IDCA design is shown in FIG. 1.

In the variation shown, a gas pressure bottle 1040 may include a mixed gas refrigerant that includes one or more of methane, ethane, Argon, isobutene, nitrogen, krypton, propane, and R14. When a focal plane array (FPA) 1001 or photodetector disposed on the cryostat 1060 is activated, the diverter manifold 1030 may be engaged or switched over to open-loop operation such that the refrigerant from the gas pressure bottle 1040 quickly cools the FPA 1001 through an open loop cooling circuit in the cryostat 1060. In some variations, an FPA 1001 may reach a desired operating temperature within ten seconds or less.

When a desired operating temperature is achieved, the diverter manifold 1030 may be switched over to a closed-loop operation, stopping the flow of refrigerant from the gas pressure bottle 1040 and engages the compressor 1050, which activates to maintain the FPA 1001 at the desired operating temperature without a further significant loss of refrigerant. Although not preferred for quickly cooling an FPA 1001 to a desired operating temperature, a closed-loop compressor-based 1050 cooling system enables the cryostat 1060 to maintain the FPA 1001 at the desired operating temperature for a relatively long period of time. In some cases, compressor-based cooling can allow for extended ongoing operation of an infra-red FPA 1001 for up to an hour or longer. In some cases, the closed-loop cooling circuit can operate indefinitely so long as there is power to run the compressor 1050. In some such variation, a closed-loop cooling circuit may also bring the FPA 1001 down to an operating temperature, but such a cooldown process may take 30 minutes or longer as compared to ten seconds or less for a high-flow open loop system.

In some variations, switching to a closed loop operation may have no effect on the flow of refrigerant from the gas pressure bottle 1040. In such variations, the FPA 1001 may be meant for a single-use application or otherwise intended to only be activated once during the course of a mission or application. In such variations, the gas pressure bottle 1040 may be reduced in size such that it holds only enough refrigerant for 10 or 20 seconds of use in the open loop cooling mode. In some such variations, the diverter manifold 1030 may include or be replaced with a valve that controls the flow of refrigerant from the gas pressure bottle 1040. In further variations, the open loop and closed-loop cooling circuits may be activated simultaneously or concurrently, such that the closed-loop cooling circuit begins working to maintain an operating temperature for the FPA 1001 at the same time that the open loop cooling circuit begins working to reduce the operating temperature to the desired level.

The variation shown has a diverter manifold 1030 with a charge port. The charge port may accept a high-pressure refrigerant source or input that can feed a high-flow, open-loop cooling circuit in the cryostat 1060 and/or can charge a low-pressure reservoir 1040 that can feed a low-pressure, low-flow open loop cooling circuit in the cryostat 1060.

In some variations, where the FPA 1001 is intended for a single-use application, such as a missile seeker or a targeting feature of a single-use or limited-use weapon or device, the diverter 1030 and/or charge port may be omitted. In further variations, the diverter manifold 1030 may be replaced with a different type of switch or switching paradigm, such as one or more valves. In some variations, the open and closed loop circuits may each have a separate, independently controlled valve to allow for either or both of the cooling circuits to be closed off at any time.

The operating temperature of the FPA 1001, as well as the selection of open-loop or closed-loop cooling may be controlled by the CPE (close proximity electronics) board 1020. Variations of CPE boards 1020 may be custom-made devices or may be programmable devices that can be configured with a range of operating programs and parameters. The required logic and programs for control of both the IDCA and the FPA 1001 disposed in the IDCA may be realized through the CPE board 1020 included in the IDCA. In some variations, the FPA 1001 may include or otherwise be attached to a motherboard also disposed inside the dewar of the IDCA. A connector may pass from inside the dewar to the CPE board for transmission of signals between the FPA 1001 and downstream control and image processing components/systems.

The variation shown in FIG. 1 includes a cryostat 1060 having dual cooling circuits. The cryostat depicted has one cooling circuit disposed therein for open-loop cooling, and a second cooling circuit for closed-loop cooling. Such a variation helps prevent unwanted refrigerant loss from the closed-loop cooling system. In some such variations, the closed-loop and open-loop systems may be simultaneously active for some period while the FPA 1001 is being brought to operating temperature. In some such variations, the diverter manifold 1030 or cooling system switch/switches may be configured to allow both cooling systems to operate simultaneously.

Such a solution solves both very fast cooldowns for applications having rapid activation time requirements and provides a means for operating the IDCA in a continuous closed-cycle mode to support missions with very long periods of operation. It combines the desirable features of or technologies currently used separately to solve applications requirements. Further variations of IDCA systems and cryo-coolers suitable for the systems, devices and techniques discussed herein are described in PCT Application No.

PCT/US2012/047688, filed on Jul. 20, 2012, the entire contents of which are hereby incorporated by reference.

One aspect of such a solution is the enablement of continuous operation of a JT-type cryocooler in a close-cycle system (operating in a mode that does not employ a gas pressure bottle) by using a piston-type compressor. This may be realized by an improved compressor and valve assembly that uses one or both of a micro check valve and an extended travel flexure bearing.

Flexure Bearing

The flexure bearing enables friction-free linear motion. Having an extended travel range in an axial direction provides advantages to many mechanisms needing this kind of motion, but attaining longer travel without exceeding the infinite fatigue life stresses in the flexing arm requires special geometry. This is especially important in situations where bearing size cannot easily or readily be increased.

Figure 2A:
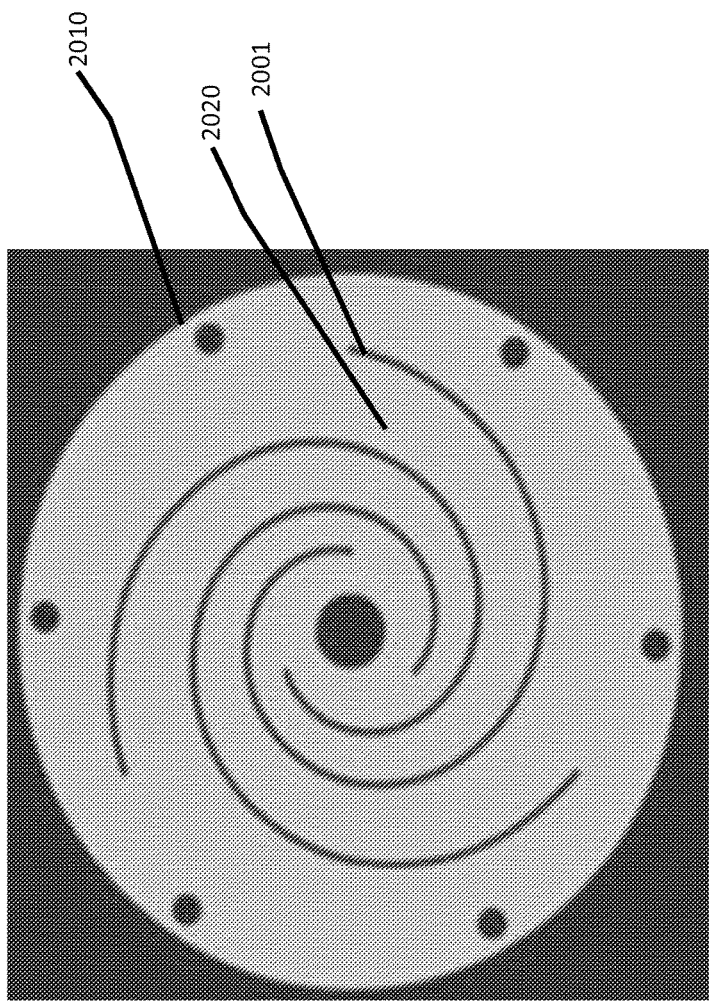
FIG. 2a depicts a variation of an embodiment of a flexure bearing.

As shown in FIG. 2a, a spiral pattern 2001 in a flat, disc-shaped flexure 2010 may provide axial travel at low spring rates and low stresses while reducing lateral excursions with high lateral spring rates. A flexing element such as the one shown in FIG. 2a may be used where a limited range of friction free travel is desired. However, such flexing elements have limited axial travel ranges which are defined and determined by the spiral pattern 2001. The spiral pattern defines one or more flexing elements 2020 which allow the flexure to travel axially (perpendicular to the plane of the flexure). The travel range of the flexure is determined by a length and flexibility of these flexing elements 2020. Extending the effective axial travel range of such an element is a non-trivial task. A variation of an extended range flexure bearing is shown in FIG. 2b.

As can be seen in FIG. 2b, the spiral pattern 2110 of the flexure 2101 provides for an extended range of movement by increasing the overall length of the flexing elements/spiral arms 2120. Such length increase is realized, in the variation shown, by removing portions 2130 of the flexure near the outer ends 2170 of the flexing elements to reduce stiffness and also by modifying the inner ends 2140 of the flexing elements/spiral arms 2120 to allow for additional reinforcement at or near the point of maximum axial travel 2150. Such a spiral pattern 2110 may be realized by geometric perturbation of an Archimedes spiral, as described by an augmenting Fourier series.

The shape of the spiral arms (flexing elements) 2120 is tailored to more evenly distribute the stress of flexing action along the arm, thereby reducing and, in some cases, eliminating, stress concentration areas. This allows for higher overall train and flexing action in the bearing. Also, wider spiral arms help maintain radial stiffness. In some variations, a shape of the spiral angle may be configured to be 480 degrees. In some such variations, a lateral stiffness of 27 N/mm may be realized with an outer flexure diameter of 70 mm In some such variations, an extension capability of 8.5 mm may be realized.

Such an extended travel flexure bearing 2101 may be made of various materials. In one variation, such a bearing may be made from stainless steel. In one variation, such stainless steel may include UHB 716. Such variations may have an effectively unlimited fatigue life. In some such variations, unlimited fatigue life may be realized by configuring the flexure 2101 to have a stress of less than 400 MPa (58 kpsi) at full extension. In some variations, a maximum stress of 600 MPa may be realized.

Although shown as having three flexing elements 2120, some variations may be designed so as to have more or fewer flexing elements. In some variations, flexure bearings having two or one flexing elements may be realized. In some variations, such an extended travel flexure may be configured to have an operating stroke of between 2 and 3 mm In some variations, the operating stroke of such a flexure 2101 may be 2.5 mm In other variations, the operating stroke of such a flexure may be 2.36 mm In some variations, such a flexure 2101 may be 0.38 mm thick. In other variations, such a flexure may be 0.25 mm thick. In further variations, such an extended travel flexure bearing may be configured to accommodate a suspended mass of up to 23 grams.

In the variation shown, the spiral pattern 2110 extends the effective length of the spiral arms/flexing elements 2120 at the outer radius for longer travel. The removal of some portions 2130 in some variations may add additional clearance for flexing near the outer base of each spiral arm 2120. In some variations, the spiral arms 2120 have an increased thickness as compared to a typical flexure 2010, allowing the extended travel flexure 2101 to maintain radial stiffness even with increased strain at the flexing element ends 2120 arising from the increased travel distance.

A typical bearing clamp is ring-shaped and attaches to the outer perimeter of the flexion bearing. A variation of a bearing clamp configured for use with an extended flexure bearing of the type shown in FIG. 2b is shown in FIG. 2c. In the variation shown, the bearing clamp 2260 includes two portions, an outer clamp portion 2201 and an inner clamp portion 2210. The outer clamp portion 2201 includes a mounting point 2220 for an outer end of a flexing element and the inner clamp portion includes a mounting point 2240 for an inner end of a flexing element.

For an extended travel flexure bearing, the clamp geometry 2250, 2270 at both inner and outer ends of the spiral arm/flexing element is configured to be perpendicular to the direction of the bend. Such a shorter and more efficient clamp line requires less space and fewer attaching screws. This is so because it simplifies the clamping and mounting, requiring a single anchor point 2240, 2220 for each end of each arm.

The effective length of the spiral arms is thereby extended by undercutting the outer clamp 2201 at the outer diameter in strategic places 2230. In some cases, this may require one or more spacers, or extra machining, but the resultant longer arm allows for longer lateral travel without increasing overall bearing diameter. A spacer may allow for small clearance for flexing near the outer base of each spiral arm, allowing for increased movement range without increasing the inner diameter of a housing base. In some variations, such a spacer may have the same size, shape and geometry as the outer clamp 2201.

Figure 2D:
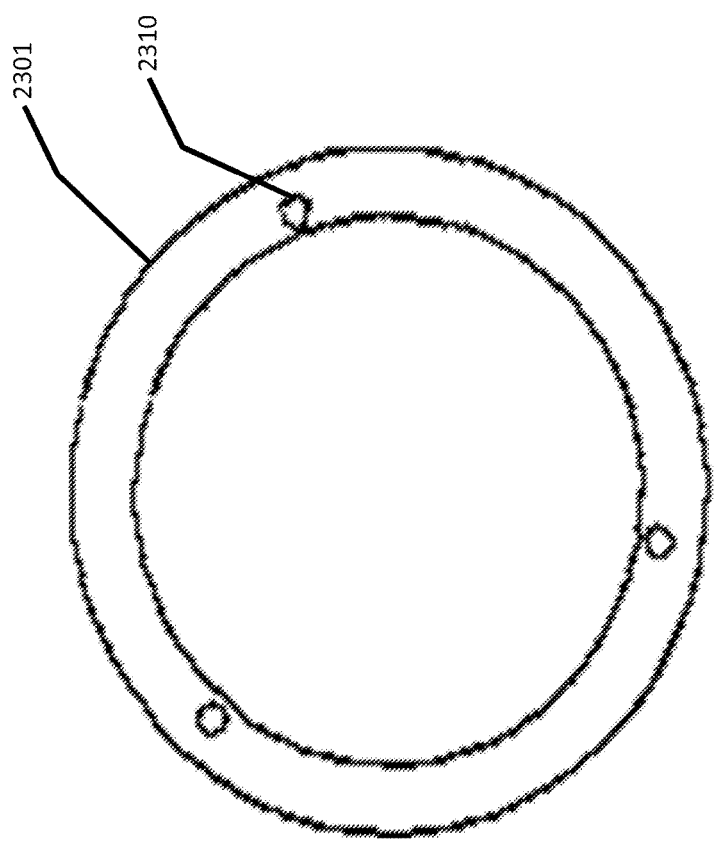
FIG. 2d depicts an embodiment of a housing base for an embodiment of an extended travel flexure bearing as disclosed herein.

Some variations of an extended travel flexure bearing of the type shown in FIG. 2b 2101 may also be equipped with a housing, as shown in FIG. 2d. Such a housing 2301 may be equipped with mounting or attachment points 2310 configured to align with the mounting points of the external clamp(s) and the spiral arms/flexing members. A variation of an assembled spiral flexure bearing that includes the components depicted and described in FIGS. 2b-2d is shown in FIG. 3a.

In the variation depicted in FIG. 3a, an interaction between the clamp 3020 3010, flexion bearing 3030, and, in the variation depicted, a spacer 3040, is shown. Although shown as having a spacer 3040 disposed between the housing 3050 and the flexion bearing 3030, other variations may not use a spacer element or may have a housing 3050 that includes an integrated spacer portion. In the variation shown, mounting bolts 3001 are used to connect the clamp 3010 3020, extended travel flexion bearing 3030, optional spacer 3040, and housing 3050. Other variations may use different fastener types such as rivets or different fastening methods such as solder or epoxy.

A variation of a flexure bearing assembly of the type shown in FIG. 3a may be used in a variation of a piston-type compressor as shown in FIG. 3b. In the variation shown, a piston 3180 moving along an axis of travel 3170 may be equipped with forward and aft flexure spiral flexure bearings 3160, 3130 connected to a housing base 3101. At least one of the flexure bearings 3130 may be equipped with inner and outer top clamp portions 3120, 3110 and, in some variations, a bottom spacer 3150. The flexure bearings may support a moving magnet assembly 3140 that is part of a motor used to move the piston 3180. A variation of such a compressor may be employed in a variation of the compressor 1050 depicted in FIG. 1.

A variation of such a compressor, equipped with extended travel flexure bearings 3160, 3130 configured for unlimited fatigue life, may be operated for an extended period and at a high rate of movement. The extended flexion/travel distance provided by the flexure bearing(s) 3160, 3130 reduces or eliminates mechanical fatigue, allowing the compressor to operate potentially indefinitely. The flexure bearing design also decreases power consumption by making requiring a reduced amount of force to move the bearing.

Micro Check Valve

Check valves allow fluid flow in one direction but restrict flow in the opposite directions. Such valves are useful in pulsating (AC) systems to "rectify" the oscillating pressure and produce unidirectional (DC) flow. Arrangements may use single or multiple valves in various combinations to produce such rectified flow.

Some variations of check-valve designs are known as "reed valves" because they utilize a straight, single-element flexure (the reed) which requires a relatively large amount of space to achieve flexibility.

Such a design results in a larger open angle at the orifice, inhibiting flow and making for an inefficient seal when closed. Such a design also makes the valve susceptible to contamination entrapment, which further impairs sealing and thus performance.

By reducing the size required to contain the valve, a check valve can be used in miniature mechanisms. Furthermore, a clamp and/or cover portion applied to the flexure limits the excursion of the flexing element, preventing damage due to overstressing. Altering the geometry of the flexure to give it a reverse-bend flexing action allows the flexure to conform to the flow port seal in the closed position, allowing for an improved seal and improved performance. This also reduces the bend angle in the open position, allowing for better flow around the flow port opening.

One variation of a check valve meeting the above criteria may be made of a 3-component assembly—a base, a flexing element, and a cover. In some variations, a base serves as a structural part that mounts the flexing element and includes a metered flow port and valve seat. A variation of such a base is shown in FIG. 4a.

In the variation shown, a bottom side of the base may be equipped with a metered entrance port 4010 and a sealing ring surface 4001. A top side of the base may be equipped with a valve seat 4040. In some variations, the valve seat is preferably polished to reduce or eliminate any sources of friction between the valve seat and valve cover, and also reduce or eliminate the possibility of anything adhering to the valve seat 4040. The valve seat 4040 may be disposed within a flexure travel clearance area 4030 meant to accommodate the flexing element (not shown). The base may also include flexure clamp edge(s) 4050, a sealing ring surface 4060, and a keying notch 4070 that may be used for alignment during installation and/or manufacturing. The base may also be equipped with designated spot weld area(s) 4020 where the check valve components may be welded together In some variations, the check valve components are made of metal. In one variation, the check valve components are made of stainless steel. Such metal variations may be well suited to assembly through spot welding. In other variations, one or more of the check valve components may be made of materials such as plastics or polymers. In some such variations, the valve components may be held together using alternate techniques, such as epoxy or rivets.

Figure 4B:
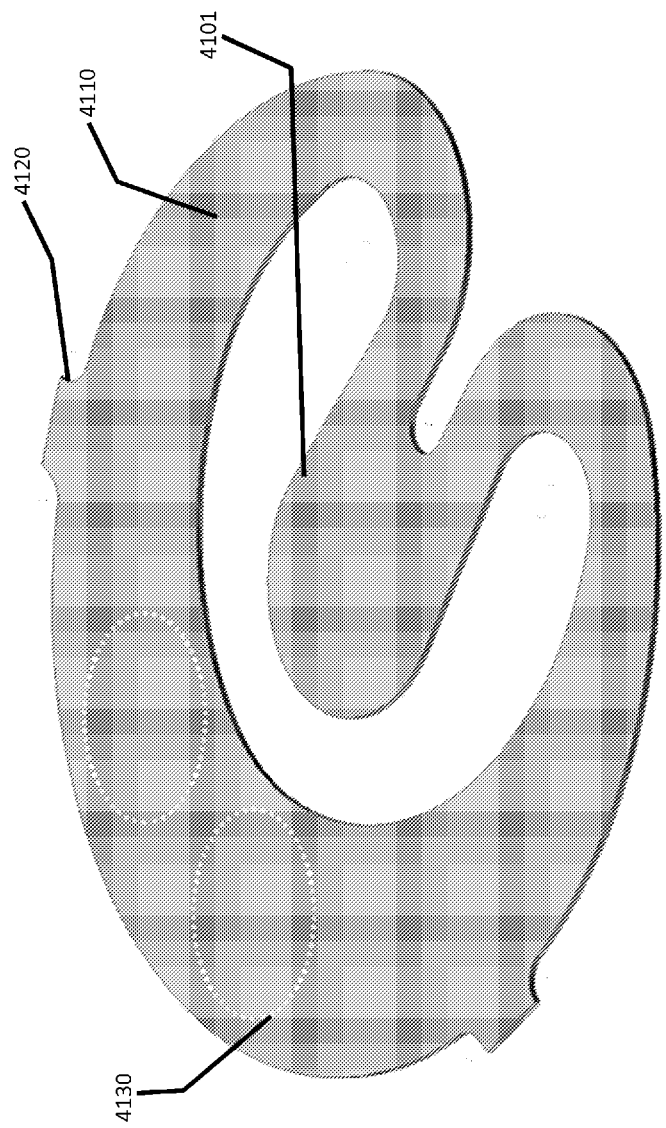
FIG. 4b depicts an embodiment of a flexure portion of an embodiment of a check valve as disclosed herein.

A variation of a flexing element, or flexure, accommodated in the flexure travel clearance area 4030 is shown in FIG. 4b. In the variation shown, the flexure is a thin flat element which bends to open and close the flow port depending on pressure gradients. A curved, bifurcated flexure design uses a double-reverse bend configuration which reduces size while also reducing opening angle of the flexed element at the flow port. The flexure embodiment shown in FIG. 4b is equipped with a valve door 4101 that is meant to cover the valve seat 4040 of the base shown in FIG. 4a. The flexure embodiment is also equipped with reverse-bend flex arms 4110 that allow the valve door 4101 to open and close, opening and closing a flow passage through the valve seat 4040. The flexure embodiment shown may be made of metal and equipped with designated spot weld areas(s) 4130 on the flexure body where the flexure may be welded to the base and to a cover.

In the variation shown, the flexure also has breakoff tab(s) 4120 left over from a production process whereby flexures are stamped from a ribbon of material. In some variations, such material may include stainless steel. In other variations, such material may include plastic or polymer. In other variations, such a breakoff tab 4120 may remain from a casting or injection molding operation used to make one or more flexures. The flexure may be attached to a base with a cover of the type depicted in FIG. 4c.

The cover piece variation shown in FIG. 4c may be used to anchor the flexing element to the base and also serves to limit its travel. On a top side, the cover piece may be equipped with one or more exit port(s) 4201 and designated spot weld areas(s) 4230 where the cover may be welded to the base and flexure. Variations of a cover may also be equipped with a flexure relief port 4210 to allow for some variations in flexure travel or deformation and also breakoff relief area(s) 4220 for the flexure breakoff tab(s) 4120.

On a bottom side of the cover piece variation shown in FIG. 4c, there may be a flexure travel recess area 4280 defined by a standoff piece 4260 and the flexure clamping edges 4270. In some variations, the flexure travel recess area 4280 of the cover piece may be configured to match the flexure travel clearance area 4030 of the base shown in FIG. 4a.

Figure 4D:
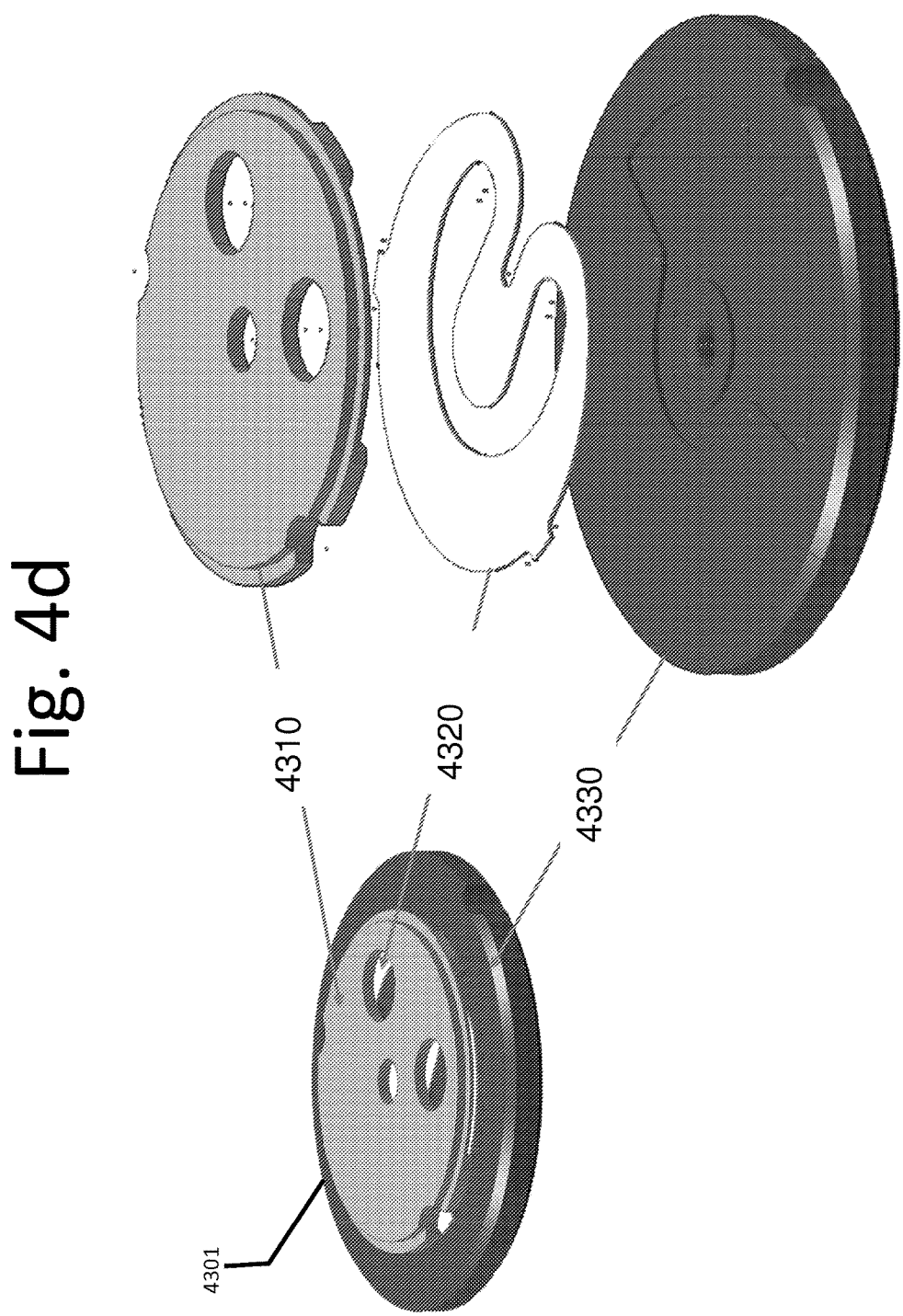
FIG. 4d depicts an embodiment of a valve assembly for an embodiment of a check valve as disclosed herein.

A variation of the overall valve, which may be welded together, may be assembled as shown in FIG. 4d. The valve 4301 may be assembled by disposing the flexure 4320 between the cover 4310 and base 4330 portions, with the bottom side of the cover 4310 matching the top side of the base 4330. In some variations, the valve is spot welded together. In such variations, some or all of the valve components may be made of metal such as, for example, stainless steel. In other variations, some or all of the valve components may be held together or otherwise assembled using rivets, epoxy, solder, or other attachment techniques. Such variations may include components made of metal, plastic, and/or polymer.

A variation of a valve is depicted in a cutaway view in FIG. 5a to illustrate valve operation. In the variation shown, the valve is depicted in an open state. The valve cover clamps the flexure 5120 to the valve base. The valve door 5110 is at an open position, the maximum opening size of which is defined by the flexure travel recess area 4280 of the valve cover 5101. The valve cover 5101 also protects the flexing arm(s) of the flexure. In the open position, the valve defines a flow path 5130 that goes from the entrance port disposed in the base, through the valve seat opened and closed by the flexure door 5110, and out one or both exit port(s) of the valve cover. As can be seen from the variation depicted, in an open condition, the valve cover limits flexure travel while still permitting flow through the valve.

Figure 5B:
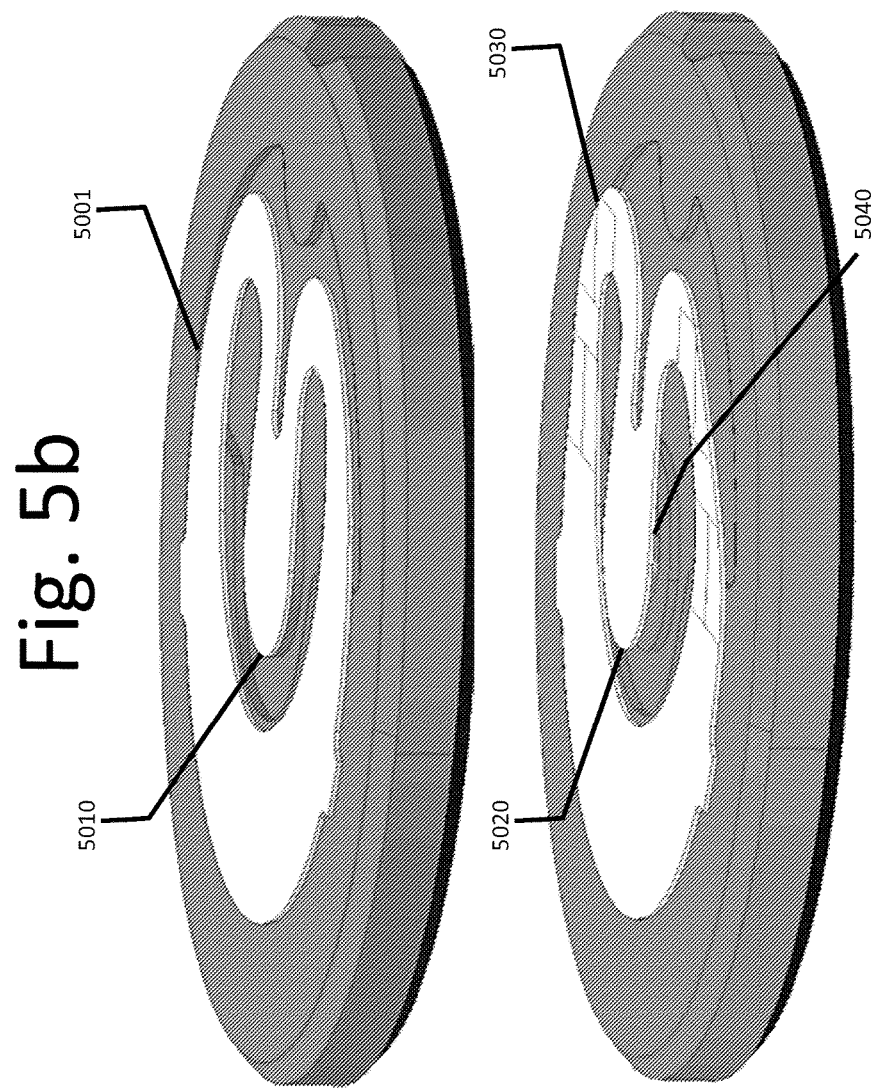
FIG. 5b depicts operation of an embodiment of a check valve as disclosed herein.

Another depiction of flexure action (with cover removed) is shown in FIG. 5b. As can be seen from the figure, when the valve door is seated 5010 on the valve seat, the flexure clamp edge 5001 helps keep the valve closed by preventing further downward deformation of the flexure into the flexure travel clearance area of the base. When the valve door is unseated, or open 5020, the reverse bend flexing arm(s) 5030 deform up into the flexure travel recess area of the cover piece (not shown), with the upper limit of valve opening defined by the flexure travel recess area of the cover piece.

A variation of an assembled valve is shown in FIG. 6. In the variation shown, a base 6001, flexure 6010, and cover 6020 may be spot-welded together to form a valve assembly. In the variation shown, the base may have a 5 mm diameter and the base and cover portions of the valve may be made entirely or partially from stainless steel. Such a valve, or variations thereof, enable continuous operation of a JT-type cryocooler, in a close-cycle system (without a stored gas bottle) in conjunction with a piston-type compressor.

The techniques and solutions discussed herein being thus described, it will be obvious that the same may be varied in many ways. Such variations are not to be regarded as departure from the spirit and scope of the techniques and solutions discussed herein, and all such modifications as would be obvious to one skilled in the art are intended to be included within the scope of the following claims.

What is claimed:

1. An integrated detector cooler assembly (IDCA) comprising:
    a planar cryostat having at least one Joule Thomson (JT) cooling circuit disposed therein wherein the at least one JT cooling circuit has a cooling closed-loop mode and a cooling open-loop mode;
    a compressor; and
    a refrigerant source having a refrigerant to be provided to the at least one JT cooling circuit wherein the refrigerant source having a source open-loop mode to provide the refrigerant for the at least one JT cooling circuits and a source closed-loop mode which stop the flow of the refrigerant from the refrigerant source;
    wherein the compressor being engaged when the refrigerant source is switched to the source closed-loop mode and provides the refrigerant to the at least one JT cooling circuit when the at least one JT cooling circuit is in the cooling closed-loop mode, the at least one JT cooling circuit being configured for continuous operation in the cooling closed-loop mode; and
    the compressor includes a compressor pump, the compressor pump including a piston operably connected to an extended travel spiral flexure bearing, the extended travel spiral flexure bearing having two or more spiral arms, each spiral arm arranged in a spiral pattern originating at a center of the bearing and extending outward towards an edge of the bearing, and being configured to enable lateral movement of the piston in a plane perpendicular to a plane of the extended travel spiral flexure hearing.

2. The IDCA of claim 1, wherein the compressor further including a check valve assembly, the check valve assembly comprising:
    a valve base equipped with an inlet port, a valve seat, a first flexure clamp area and, a flexure travel clearance area;
    a valve cover equipped with an exhaust port, a second flexure clamp area, and a flexure travel recess area; and
    a valve flexure element comprising a flexure body leaving a valve door, reverse-bend flexure arms connected to the valve door, and a bonding area coupled to each of the reverse-bend flexure arms; wherein the valve base, the flexure body, and the valve cover are bonded together at the bonding area, the check valve assembly configured to have open and closed valve positions, wherein the closed valve position is realized when the valve door rests on the valve seat and wherein the open position is realized when the valve door is lifted from the valve seat in a space defined by a combination of the flexure travel recess area and the flexure travel clearance area.

3. The IDCA of claim 1, wherein the spiral flexure bearing includes three spiral arms arranged in a spiral pattern of 480 degrees.

4. The IDCA of claim 3, wherein the extended spiral flexure bearing has an operating stroke of at least 2.3 mm.

5. The IDCA of claim 1, wherein the extended travel spiral flexure bearing is a first extended travel spiral flexure bearing and the compressor pump further including a second extended travel spiral flexure bearing.

6. The IDCA of claim 5, wherein the first extended travel spiral flexure bearing and the second extended travel spiral flexure bearing are disposed on opposite sides of a moving magnet assembly disposed within the compressor pump.

7. The IDCA of claim 2, further comprising a bearing clamp attached to the extended travel spiral flexure bearing, the bearing clamp including:
    an outer clamp; and
    an inner clamp, the outer clamp being physically separate from the inner clamp;
    the outer clamp being disposed at the edge of the extended travel spiral bearing and being attached to an outer end of each spiral arm of the extended travel spiral flexure bearing; and
    the inner clamp being disposed at the center of the extended travel spiral flexure bearing and being attached to an inner end of each spiral arm of the extended travel spiral flexure bearing.

8. The IDCA of claim 6, wherein the compressor pump further including a housing base arranged around the moving magnet assembly such that the first extended travel spiral flexure is attached to one end of the housing base and the second extended travel spiral flexure is attached to an opposite end of the housing base.

* * * * *

UNITED STATES PATENT AND TRADEMARK OFFICE
CERTIFICATE OF CORRECTION

PATENT NO. : 9,863,670 B2  
APPLICATION NO. : 14/346140  
DATED : January 9, 2018  
INVENTOR(S) : Patrick Champagne Page 1 of 1

It is certified that error appears in the above-identified patent and that said Letters Patent is hereby corrected as shown below:

In the Claims

Column 13, Claim 1, Line 57, delete "stop" and insert --stops--.

Column 14, Claim 2, Line 19, delete "leaving" and insert --having--; and

Claim 7, Line 52, after "spiral" insert --flexure--.

Signed and Sealed this  
Tenth Day of April, 2018

Andrei Iancu  
*Director of the United States Patent and Trademark Office*